United States Patent
Pang et al.

(10) Patent No.: US 11,403,468 B2
(45) Date of Patent: Aug. 2, 2022

(54) METHOD AND APPARATUS FOR GENERATING VECTOR REPRESENTATION OF TEXT, AND RELATED COMPUTER DEVICE

(71) Applicant: BEIJING BAIDU NETCOM SCIENCE AND TECHNOLOGY CO., LTD., Beijing (CN)

(72) Inventors: Chao Pang, Beijing (CN); Shuohuan Wang, Beijing (CN); Yu Sun, Beijing (CN); Zhi Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 16/939,947

(22) Filed: Jul. 27, 2020

(65) Prior Publication Data
US 2021/0192141 A1    Jun. 24, 2021

(30) Foreign Application Priority Data

Dec. 20, 2019    (CN) .......................... 201911334964.9

(51) Int. Cl.
*G06F 40/30*    (2020.01)
*G06N 20/00*    (2019.01)

(52) U.S. Cl.
CPC ............. *G06F 40/30* (2020.01); *G06N 20/00* (2019.01)

(58) Field of Classification Search
CPC ................................ G06F 40/30; G06N 20/00
See application file for complete search history.

(56) References Cited

U.S. PATENT DOCUMENTS

| | | | |
|---|---|---|---|
| 2018/0293978 A1* | 10/2018 | Sinha | G06F 40/232 |
| 2019/0258700 A1 | 8/2019 | Beaver et al. | |
| 2020/0110882 A1* | 4/2020 | Ripolles Mateu | G06F 16/353 |
| 2020/0285811 A1* | 9/2020 | Cao | G06F 40/30 |
| 2021/0216880 A1* | 7/2021 | Jin | G06N 3/0454 |

FOREIGN PATENT DOCUMENTS

| | | |
|---|---|---|
| CN | 105653671 A | 6/2016 |
| CN | 107491547 A | 12/2017 |
| CN | 108733653 A | 11/2018 |
| CN | 108829818 A | 11/2018 |

(Continued)

OTHER PUBLICATIONS

Rong Zhong, "Office Action for CN Application No. 201911334964.9", dated Aug. 28, 2020, CNIPA, China.

(Continued)

*Primary Examiner* — Kevin Ky
(74) *Attorney, Agent, or Firm* — Novick, Kim & Lee, PLLC; Zhi Yang Xue; Jihun Kim (57) ABSTRACT

A method for generating a vector representation of a text includes dividing the text into text segments. Each text segment is represented as a segment vector corresponding to the respective text segment by employing a first-level semantic model. The segment vector is configured to indicate a semantics of the text segment. Text semantics recognition is performed on the segment vector of each text segment by employing a second-level semantic model to obtain a text vector for indicating a topic of the text.

17 Claims, 5 Drawing Sheets

--- dividing the text into multiple text segments — 101 representing each text segment as a segment vector corresponding to a respective text segment by employing a first-level semantic model, a mapping relationship between a character of each text segment and the segment vector of the text segment being obtained from the first-level semantic model, and the segment vector being configured to indicate semantics of the text segment — 102 performing text semantics recognition on the segment vector of each text segment by employing a second-level semantic model to obtain a text vector for indicating a topic of the text, a mapping relationship between segment vectors and the text vector being obtained from the second-level semantic model — 103

(56) References Cited

FOREIGN PATENT DOCUMENTS

| | | | |
|---|---|---|---|
| CN | 108920929 A | 11/2018 | |
| CN | 109243616 A | 1/2019 | |
| CN | 109635116 A | 4/2019 | |
| CN | 109933667 A | 6/2019 | |
| CN | 110399606 A | 11/2019 | |
| CN | 110413992 A | 11/2019 | |
| CN | 110532381 A | 12/2019 | |
| WO | 2019232645 A1 | 12/2019 | |

OTHER PUBLICATIONS

Zichao Yang et al., "Hierarchical Attention Networks for Document Classification", Carnegie Mellon University and Microsoft Research, Redmond.
Takatoshi Kimura, "Office Action for JP Application No. 2020-108873", dated Oct. 5, 2021, JPO, Japan.
Rong Zhong, "Second Office Action for ON Application No. 201911334964.9", dated Dec. 2, 2020, CNIPA, China.

* cited by examiner

METHOD AND APPARATUS FOR GENERATING VECTOR REPRESENTATION OF TEXT, AND RELATED COMPUTER DEVICE

CROSS REFERENCE TO RELATED APPLICATIONS

This application claims priority and benefits to Chinese Application No. 201911334964.9, filed on Dec. 20, 2019, the entire content of which is incorporated herein by reference.

FIELD

The present disclosure relates to a field of artificial intelligence technology, particularly to a field of natural language processing technologies, and more particularly to a method and an apparatus for generating a vector representation of a text, and a related computer device.

BACKGROUND

Nowadays, in Internet applications, how to address a large number of natural language processing tasks is a problem to be solved. In fact, it is a simple and effective solution to represent the texts of different levels as semantics vectors. A character, a word, a sentence, a paragraph and even a text may be represented as the semantics vectors, and these vectors may be used as features of a downstream model.

SUMMARY

Embodiments of the present disclosure provide a method for generating a vector representation of a text. The method includes:

dividing a text into a plurality of text segments;

representing each text segment as a segment vector corresponding to the respective text segment by employing a first-level semantic model, in which, a mapping relationship between a character of each text segment and the segment vector is obtained from the first-level semantic model, and the segment vector is configured to indicate semantics of the text segment;

performing text semantics recognition on the segment vector of each text segment by employing a second-level semantic model to obtain a text vector for indicating a topic of the text, in which, a mapping relationship between segment vectors and the text vector is obtained from the second-level semantic model.

embodiments of the present disclosure provide a computer device. The computer device includes a memory, a processor; and a computer program stored in the memory and executable by the processor. When the computer program is executed by the processor, the method for generating a vector representation of a text according to the first aspect is executed.

embodiments of the present disclosure provide a non-transitory computer readable storage medium, having a computer program stored thereon. When the computer program is executed by a processor, the method for generating a vector representation of a text according to the first aspect is executed.

Additional aspects and advantages of the present disclosure may be set forth in part in the following description, and some may be apparent from the following description, or may be learned by practice of the present disclosure.

BRIEF DESCRIPTION OF THE DRAWINGS

The above and/or additional advantages and aspects of the present disclosure will become more apparent and be understood more easily with reference to accompanying drawings and detailed illustrations for embodiments, in which.

DETAILED DESCRIPTION

Description will be made in detail below to embodiments of the present disclosure. Examples of those embodiments are illustrated in accompanying drawings. Same or similar reference numerals refer to same or similar elements or elements having same or similar functions throughout. The embodiments described below with reference to the accompanying drawings are exemplary and are intended to explain the present disclosure, and should not be construed as a limitation of the present disclosure.

In related arts, since Google issued a model such as BERT (bidirectional encoder representations from transformers), various improved models have appeared continuously, refreshing an understanding level of the natural language. The model such as the BERT may naturally generate vector representations of sentences and vector representations of words, by constructing learning tasks on a large-scale corpus. However, existing models are set inappropriately, causing separation of the meaning or information of the text between adjacent paragraphs, such that full information of the text cannot be used. In addition, some information of the text may be lost.

Furthermore, the existing models may only generate representations of words or a whole text, but may not obtain a representation of a different level, such as representations of paragraphs or sentences of the text. However, during processing the text and the task, it may be important to obtain representations of different levels.

In view of the above, embodiments of the present disclosure provide a method and an apparatus for generating a vector representation of a text, and a related computer device, which will be described below with reference to the accompanying drawings.

In the related art, there are mainly two solutions of the vector representation of a text.

One solution is to use the BERT issued by Google to construct a learning task on a large-scale corpus. In this way, vector representations of sentences and vector representations of words may be naturally generated. These vectors are useful features for addressing many natural language understanding tasks. However, a length of the input to the model is limited. When there is a long text to be inputted to the model, the model may be useless. In fact, a common solution is to divide the long text into text segments to fit the length required by the model, but this is often undesirable. For example, for a task of summarizing the text, when a distance from a beginning position of the text to important information longer than the required length, the text cannot be summarized accurately. In fact, in order to apply the BERT to the long text, the developers design ingenious models, such as Tansformer-XL model and other improved models. These models may obtain the representation of a previous text segment in a previous step, and obtain, through feedforward, the representation of a current text segment in the current step, by utilizing the representation of the previous text segment. In this way, the representations obtained respectively through the feedforward and feedback during training the model may be separated.

The other solution is to use a topic model (such as an LSA (latent sematic analysis) model) to process the text to obtain a bag of word matrix. Each row of the bag of word matrix represents a text, each column represents a word, and a value of each element represents the number of occurrences of the word in the text. Through performing the singular value decomposition on the matrix, topic words of the text may be obtained. These topic words may be used to represent the text.

In fact, there are many problems in using the LSA model. The LSA model is obtained by matrix decomposition, and thus physical meanings of space dimensions are not clear and cannot be explained. In addition, the calculation paradigm of the model is too complex to understand and the number of topics needs to be manually set, which may lead to inappropriate number set and loss of information of the text.

In order to solve technical problems, existing in the related art, that the information is lost and vector representations of different levels cannot be obtained from the text during the vector representation of the text, the present disclosure provides a method for generating a vector representation of a text. In this method, the text is divided into multiple text segments. Each text segment is represented as a segment vector corresponding to the respective text segment by employing a first-level semantic model. A mapping relationship between a character of each text segment and the segment vector is obtained from the first-level semantic model. The segment vector is configured to indicate semantics of the text segment. Text semantics recognition is performed on the segment vector of each text segment by employing a second-level semantic model to obtain a text vector for indicating a topic of the text. A mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text is obtained and the loss of information is reduced.

Figure 1:
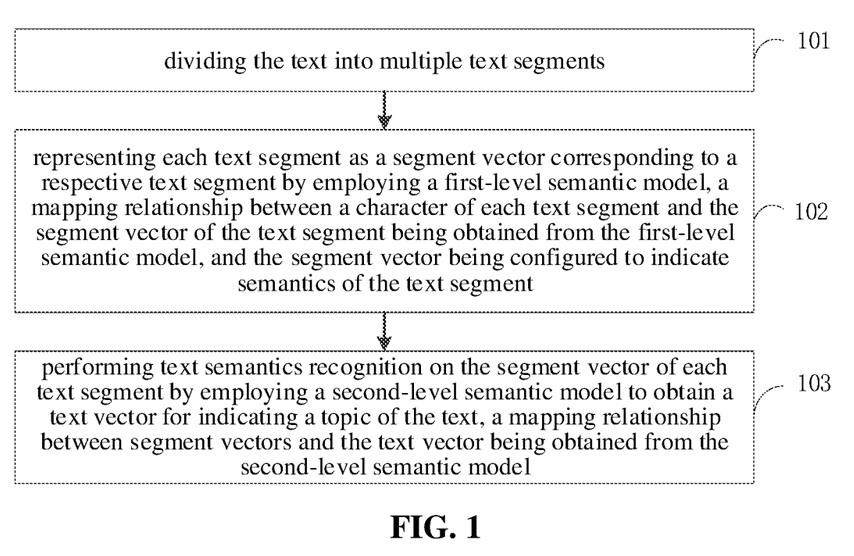
FIG. 1 is a flowchart illustrating a method for generating a vector representation of a text according to embodiments of the present disclosure.

FIG. 1 is a flowchart illustrating a method for generating a vector representation of a text according to embodiments of the present disclosure.

As illustrated in FIG. 1, the method may include the following.

At block 101, the text is divided into multiple text segments.

In detail, the model requires to divide an inputted text into multiple text segments, and a maximum length of each text segment is 512 Chinese characters, i.e. 512 characters at most. The length of the text segment is not limited in embodiments.

At block 102, each text segment is represented as a segment vector corresponding to the respective text segment by employing a first-level semantic model. A mapping relationship between a character of each text segment and the segment vector is obtained from the first-level semantic model. The segment vector is configured to indicate semantics of the text segment.

In detail, an end character may be added at an end of each text segment. For example, the end character is [SEP]. Each text segment including the end character may be input to the first-level semantic model to obtain the vector representation of each character of the text segment outputted by the first-level semantic model. For each text segment, the vector representation of the end character of that text segment may be taken as the segment vector of that text segment.

It should be noted that, for each text segment, multiple characters may be included in each text segment. From the first character to the last character of the text segment, the vector representation of a posterior character is added with the vector representation of a previous character. Therefore, the vector representation of the end character includes vector representations of all characters included in the text segment. The vector representation of the end character of the text segment may be taken as the segment vector of the text segment for indicating the semantics of the text segment.

At block 103, text semantics recognition is performed on the segment vector of each text segment by employing a second-level semantic model to obtain a text vector for indicating a topic of the text. A mapping relationship between segment vectors and the text vector is obtained from the second-level semantic model.

In detail, for the segment vector of each text segment, an element of position is added to the segment vector to obtain an input vector of the text segment. The element of position is configured to indicate a position of the text segment in the text. That is, the element of position is configured to indicate which segment of the text corresponding to the text segment. The input vector of each text segment is input together with a reference vector equaling to an initial value to the second-level semantic model. The second-level semantic model may adjust the value of the reference vector based on the input vector of each text segment to obtain an adjusted reference vector. The adjusted reference vector is taken as the text vector to indicate the topic of the text, such that the mapping relationship between the segment vector of each text segment and the text vector is established.

It should be noted that, in embodiments, independent positional coding is performed for each segment. The reference vector equaling to the initial value is a preset learnable vector, such as, a learning class (CLS) vector.

In the method for generating the vector representation of the text according to embodiments, the text is divided into the multiple text segments. Each text segment is represented as the segment vector corresponding to the respective text segment by employing the first-level semantic model. The mapping relationship between a character of each text segment and the segment vector is obtained from the first-level semantic model. The segment vector is configured to indicate the semantics of the text segment. The text semantics recognition is performed on the segment vector of each text segment by employing the second-level semantic model to obtain the text vector for indicating the topic of the text.

The mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text may be obtained and the loss of information may be reduced.

Figure 2:
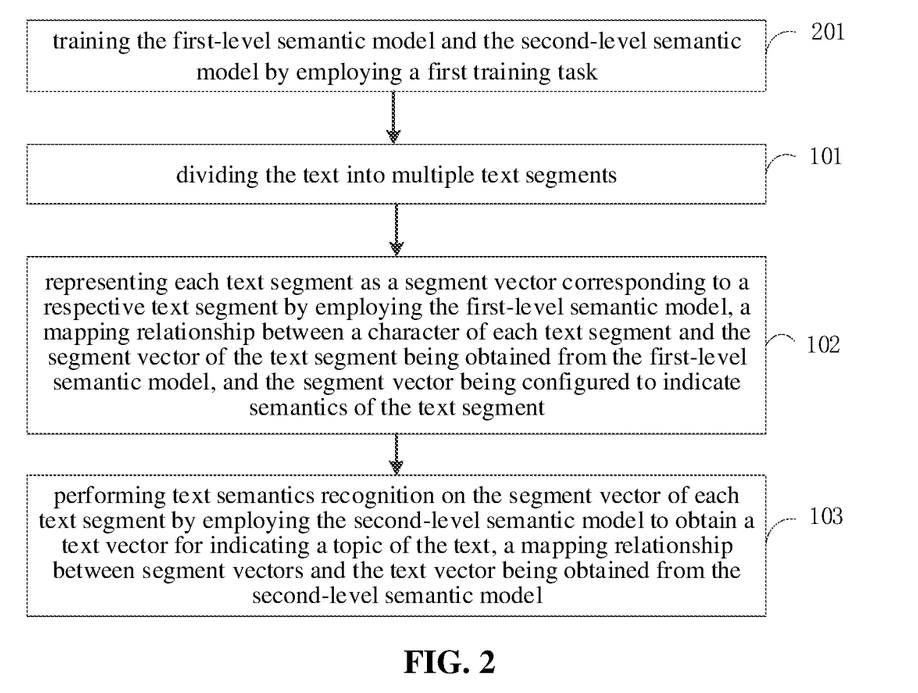
FIG. 2 is a flowchart illustrating another method for generating a vector representation of a text according to embodiments of the present disclosure.

Before the first-level semantic model and the second-level semantic model are employed for performing recognition, there is a need to train the first-level semantic model and the second-level semantic model. Based on the above, embodiments provide another method for generating a vector representation of a text to show how to train the first-level semantic model and the second-level semantic model based on a first training task. FIG. 2 is a flowchart illustrating another method for generating a vector representation of a text according to embodiments of the present disclosure.

As illustrated in FIG. 2, before the text is divided into the text segments, the method may also include the following.

At block 201, the first-level semantic model and the second-level semantic model are trained by employing the first training task.

Figure 3:
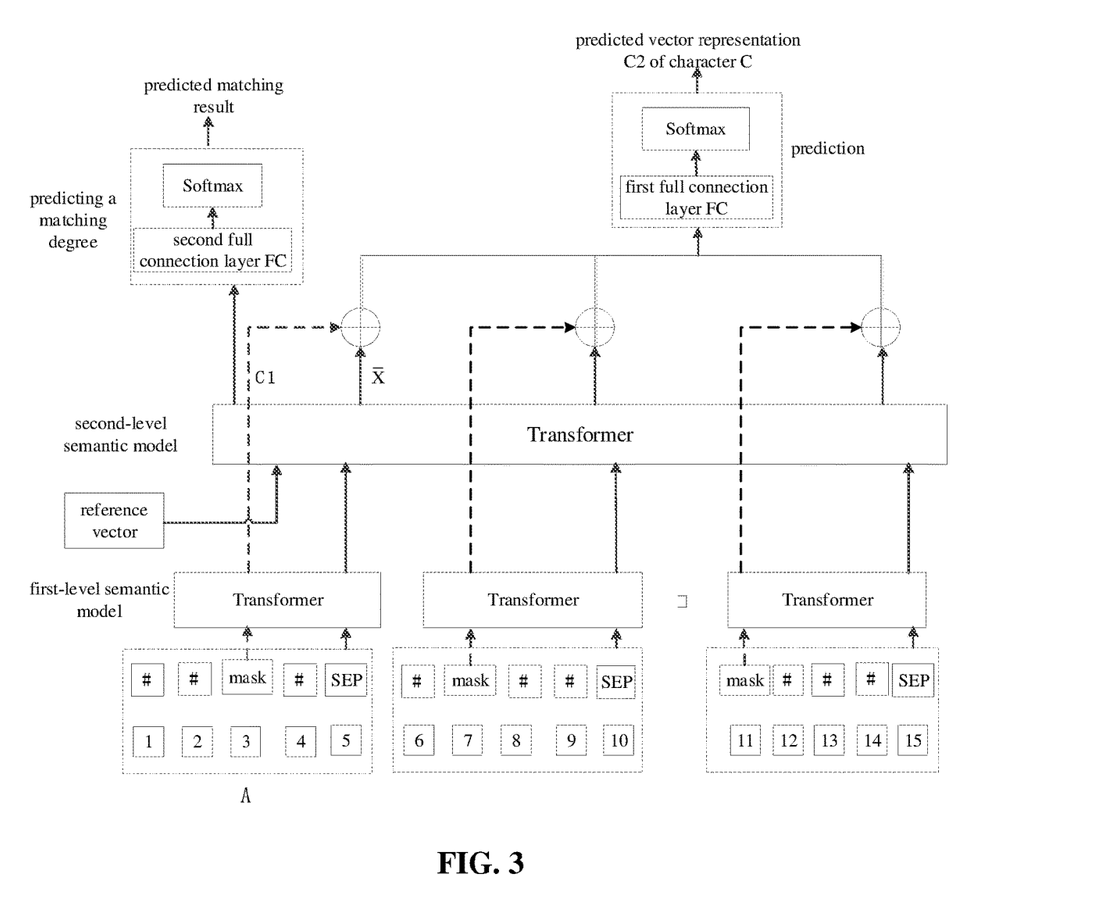
FIG. 3 is a schematic diagram illustrating a model according to the present disclosure.

FIG. 3 is a block diagram illustrating a model according to the present disclosure. As illustrated in FIG. 3, the model includes semantic models of two levels, i.e., first-level semantic model and second-level semantic model. Multiple first-level semantic models may be included.

Each first-level semantic model corresponds to a text segment. Each first-level semantic model is configured to represent the corresponding text segment as the segment vector. The second-level semantic model is configured to perform text semantic recognition on the segment vector of each text segment to obtain the text vector for indicating the topic of the text. By setting the model to include multi-level structure, semantic segment information of different levels may be obtained, and requirements for different practical application scenarios may be met. For example, in an application related to search engine, not only the corresponding text needs to be obtained, but also the corresponding segment of the text needs to be obtained.

The first training task may include the following. A training text is divided into multiple text segments. Each text segment includes multiple characters. For each text segment, the vector representation of a certain character included in that text segment may be obtained. A predicted vector representation of the certain character is obtained based on the vector representation of the certain character and the text vector. Parameters of the first-level semantic models and the second-level semantic model are adjusted based on a difference between the vector representation of the certain character and the predicted vector representation of the certain character. Multiple first-level semantic models may be included and may share common parameters to reduce the number of parameters, thereby improve training efficiency of the first-level semantic models.

For example, as illustrated in FIG. 3, the training text may be 1, 2, 3, 4, 5, 6, 7, 8, 9, 10, 11, 12, 13, 14, 15. The training text is divided into 3 text segments each including 5 characters. For example, the first text segment A is 1, 2, 3, 4, 5. Any one of the text segments of the training text may be selected. For example, the first text segment A is selected. An end character [SEP] is added at the end of the first text segment A and the first text segment A including the end character is processed. A certain character to be predicted may be determined and masked with a special character "mask". As illustrated in FIG. 3, the character to be predicted is the third one of the first text segment A. The processed first text segment A is inputted to a corresponding first-level semantic model to obtain the vector representation of the text segment A. The vector representation C1 of the character that is masked by the special character "mask" is obtained and the text vector X is obtained by inputting all the segment vectors of the training text into the second-level semantic model. The vector representation C1 of the character and the text vector X are input to a first full connection layer for performing a prediction to obtain a predicted vector representation C2 of the character. The predicted vector representation C2 of the character is compared with the vector representation C1 of the character to obtain a difference. The parameters of the first-level semantic models and the second-level semantic model are adjusted base on the difference. The parameters of the models are continuously adjusted through the training tasks, such that the first-level semantic models and the second-level semantic model converge, i.e. the difference between the vector representation of the character and the predicted vector representation of the character is minimized.

It should be noted that, in the first training task, both the vector representation of the character and the text-level vector representation of the training text are taken into account when determining the predicted vector representation of the character. In other words, when the prediction is performed on the character, the vector representation of the whole text is taken into account, such that semantics of the whole text is taken into account. The full information of the text is utilized, thereby reducing the loss of information, avoiding separation of semantics of the text, and enabling the model training more effective.

Other actions illustrated in FIG. 2 may refer to blocks 101-103 described with respect to FIG. 1, having the same principle to blocks 101-103, and being not elaborated herein.

In the method for generating a vector representation of a text according to embodiments, the first-level semantic models and the second-level semantic model are trained by employing the first training task to adjust the parameters of the models, thereby improving effect of the model training. The text is divided into multiple text segments. Each text segment is represented as the segment vector corresponding to the respective text segment by employing the trained first-level semantic model. The mapping relationship between a character of each text segment and the segment vector of that text segment is obtained from the first-level semantic model. The segment vector is configured to indicate the semantics of the text segment. The text semantics recognition is performed on the segment vector of each text segment by employing the second-level semantic model to obtain the text vector for indicating the topic of the text. The mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text information may be obtained and the loss of information may be reduced.

Figure 4:
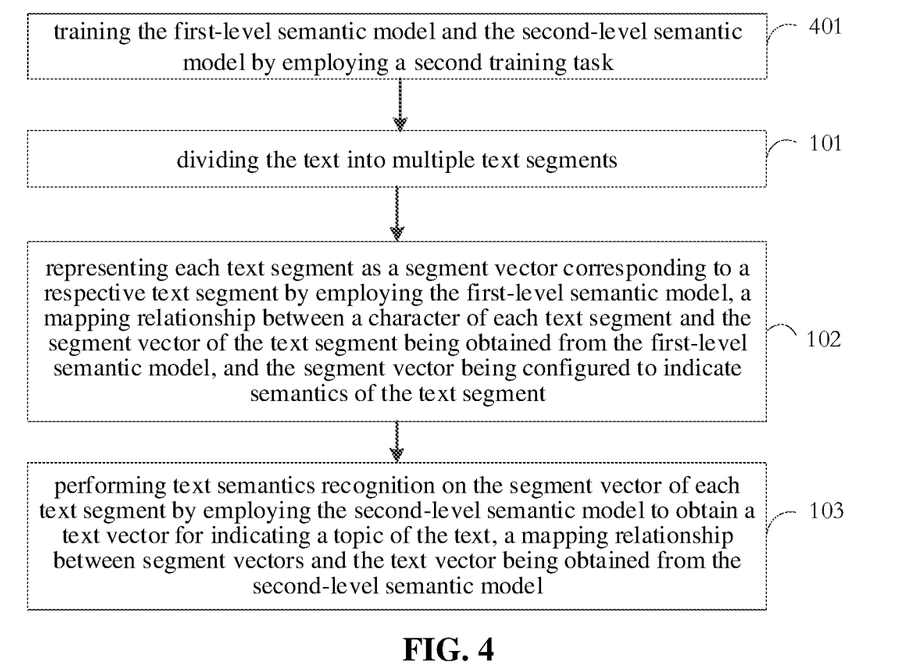
FIG. 4 is a flowchart illustrating yet another method for generating a vector representation of a text according to embodiments of the present disclosure.

Based on the above, embodiments of the present disclosure also provide yet another method for generating a vector representation of a text to describe how to train the first-level semantic model and the second-level semantic model based on a second training task. FIG. 4 is a flowchart illustrating yet another method for generating a vector representation of a text according to embodiments of the present disclosure.

As illustrated in FIG. 4, before the text is divided into the multiple text segments, the method may include following.

At block 401, the first-level semantic model and the second-level semantic model are trained by employing a second training task.

The second training task may include the following. A text vector of a training text is obtained. The training text is obtained by splicing a training body text and a training title. It is predicted whether semantics of the training text of training samples matches with semantics of the training title based on the text vector to obtain a predicted matching result. Parameters of the first-level semantic model and the second-level semantic model are adjusted based on a difference between the predicted matching result and an actual matching result. In embodiments, there are multiple training texts including positive training texts and negative training texts. The positive training text is obtained by splicing the training body text and the training title corresponding to that training body text. The negative training text is obtained by splicing the training body text and the training title corresponding to another training body text.

In embodiments, the training text may be news. Through a web crawler technology, a large amount of news corpus may be obtained from the network. Each news corpus may be divided into a body text and a title corresponding to the body text. The positive training text may be obtained by splicing the body text and the title corresponding to that body text. The negative training text may be obtained by splicing the body text and another title randomly selected from other titles than the one corresponding to the body text. The positive training texts and the negative training text may be taken as training samples. The training texts are marked to obtain a marked matching result reflecting an actual matching result. The number of positive training texts may be equal to the number of negative training texts. Each training sample is input into the first-level semantic model to obtain the text vector of the respective training sample. The text vector is input to a second full connection layer for predicting a matching degree between the title and the body text, to output a predicted matching result. The difference between the predicted matching result and the marked match result is determined. The parameters of the first-level semantic model and the second-level semantic model are adjusted based on the difference. The parameters of the models are continuously adjusted, to make the first-level semantic model and the second-level semantic model converge, i.e. the difference between the predicted matching result and the actual matching result is minimized.

It should be understood that, the first full connection layer and the second full connection layer illustrated in FIG. 3 are different from each other, thereby improving the adaptability and training effect of training different models.

In examples, each part of the model in this embodiment, such as the first-level semantic model and the second-level semantic model, may be arranged in a computer device as different pars. Throughput of the model may be improved through synchronous calculation among many devices.

Other actions illustrated in FIG. 4 may refer to blocks 101-103 described with respect to FIG. 1, having the same principle to blocks 101-103, and being not elaborated herein.

It should be noted that, in the above embodiments, the first-level semantic model and the second-level semantic model are trained by using the first training task or the second training task. However, in order to improve the training effect, the first-level semantic model and the second-level semantic model may be trained by alternately executing the first training task and the second training task.

The two training tasks are performed iteratively. A loss value of the model is calculated based on a predicted result of the first training task and a predicted result of the second training task. The loss value of the model is obtained through loss values of loss functions corresponding to the two training tasks. Based on the loss value of the model, the parameters of the first-level semantic model and the second-level semantic model are adjusted to enable the loss functions of the two training tasks converge. In this way, a problem of the separation of semantics caused by the separation of feedforward and feedback stages during training a conventional Transfoermer-XL model may be avoided, training effect of the model may be improved, and accuracy and reliability of the text vector for indicating the topic of the text obtained by the model may be improved.

In the method for generating the vector representation of the text according to embodiments, the text is divided into the multiple text segments. Each text segment is represented as the segment vector corresponding to the respective text segment by employing the first-level semantic model. The mapping relationship between a character of each text segment and the segment vector of that text segment is obtained from the first-level semantic model. The segment vector is configured to indicate the semantics of the text segment. The text semantic recognition is performed on the segment vector of each text segment by employing the second-level semantic model to obtain the text vector for indicating the topic of the text. The mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text may be obtained and the loss of information may be reduced.

In order to implement the above, the present disclosure also provides an apparatus for generating a vector representation of a text.

Figure 5:
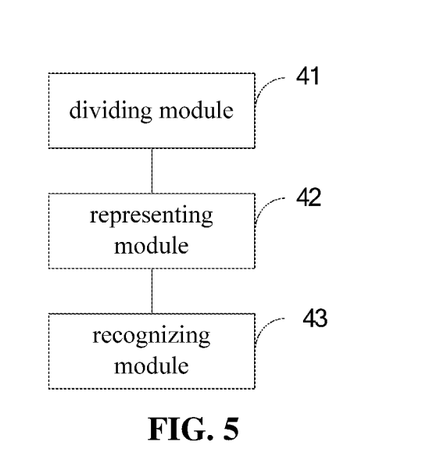
FIG. 5 is a block diagram illustrating an apparatus for generating a vector representation of a text according to embodiments of the present disclosure.

FIG. 5 is a block diagram illustrating an apparatus for generating a vector representation of a text according to embodiments of the present disclosure.

As illustrated in FIG. 5, the apparatus may include a dividing module 41, a representing module 42, and a recognizing module 43.

The dividing module 41 is configured to divide the text into multiple text segments.

The representing module 42 is configured to represent each text segment as a segment vector corresponding to a respective text segment by employing a first-level semantic model. A mapping relationship between a character of each text segment and the segment vector of that text segment is obtained from the first-level semantic model. The segment vector is configured to indicate semantics of the text segment.

The recognizing module 43 is configured to perform text semantics recognition on the segment vector of each text segment by employing a second-level semantic model to obtain a text vector for indicating a topic of the text. A mapping relationship between segment vectors and the text vector is obtained from the second-level semantic model.

Further, in a possible implementation of embodiments of the present disclosure, the apparatus may also include a first training module and a second training module.

The first training module is configured to train the first-level semantic model and the second-level semantic model by employing a first training task.

The first training task includes the following. For each text segment, the vector representation of a character included in the text segment is obtained. A predicted vector representation of the character is obtained based on the vector representation of the character and the text vector. Parameters of the first-level semantic model and the second-level semantic model are adjusted based on a difference between the predicted vector representation of the character and the vector representation of the character.

The second training module is configured to train the first-level semantic model and the second-level semantic model by employing a second training task.

The second training task may include the following. The text vector of a training text is obtained. The training text is obtained by splicing a training body text and a training title. It is predicted whether semantics of the training text of training samples matches with semantics of the training title based on the text vector, to obtain a predicted matching result. Parameters of the first-level semantic model and the second-level semantic model are adjusted based on a difference between the predicted matching result and an actual matching result.

As a possible implementation, there are multiple training texts including positive training texts and negative training texts. The positive training text is obtained by splicing the training body text and the training title corresponding to the training body text. The negative training text is obtained by splicing the training body text and the training title corresponding to another training body text.

As a possible implementation, there are multiple first-level semantic models. Each first-level semantic model is configured to represent a corresponding text segment as the segment vector. The multiple first-level semantic models share common parameters.

As a possible implementation, the representing module 42 is further configured to, for each text segment, add an end character at an end of the text segment, and input the text segment including the end character to the first-level semantic model to obtain the vector representation of each character of the text segment outputted by the first-level semantic model, and take the vector representation of the end character of the text segment as the segment vector of the text segment.

As a possible implementation, the recognizing module 43 is further configured to: for the segment vector of each text segment, add an element of position to the segment vector to obtain an input vector of the text segment. The element of position is configured to indicate a position of the text segment in the text. In addition, the recognizing module 43 is further configured to input the input vector of each text segment to the second-level semantic model together with a reference vector equaling to an initial value, such that the second-level semantic model adjusts a value of the reference vector based on each input vector to obtain an adjusted reference vector; and take the adjusted reference vector as the text vector.

It should be noted that, the above description for the method for generating a vector representation of a text is also applicable to the apparatus for generating a vector representation of a text described herein, which is not elaborated.

In the apparatus for generating a vector representation of a text according to embodiments, the text is divided into the multiple text segments. Each text segment is represented as the segment vector corresponding to the respective text segment by employing the first-level semantic model. The mapping relationship between a character of each text segment and the segment vector of that text segment is obtained from the first-level semantic model. The segment vector is configured to indicate the semantics of the text segment. The text semantics recognition is performed on the segment vector of each text segment by employing the second-level semantic model to obtain the text vector for indicating the topic of the text. The mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text is obtained and the loss of information is reduced.

In order to implement the above embodiment, the present disclosure also provides a computer device. The computer device includes a memory, a processor; and a computer program stored in the memory and executable by the processor. When the computer program is executed by the processor, the method for generating a vector representation of a text described above may be executed.

In order to achieve the above objectives, the present disclosure also provides a non-transitory computer readable storage medium, having a computer program stored thereon. When the computer program is executed by a processor, the method for generating a vector representation of a text described above may be executed.

According to embodiments of the present disclosure, the present disclosure also provides an electronic device and a readable storage medium.

Figure 6:
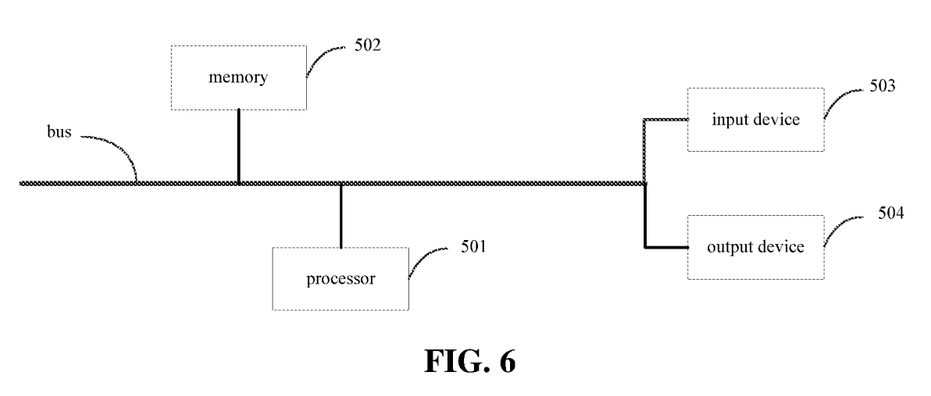
FIG. 6 is a block diagram illustrating an electronic device for implementing a method for generating a vector representation of a text according to embodiments of the present disclosure.

FIG. 6 is a block diagram illustrating an electronic device for implementing a method for generating a vector representation of a text according to embodiments of the present disclosure. The electronic device is intended to represent respective forms of digital computers, such as a laptop computer, a desktop computer, a workstation, a personal digital assistant, a server, a blade server, a mainframe computer, or other suitable computers. The electronic device may also represent respective forms of mobile devices, such as personal digital processing, a cellular phone, a smart phone, a wearable device, or other similar computing device. The components illustrated herein, their connections and relationships, and their functions are merely examples, and not intended to limit the implementation of the present disclosure described and/or claimed herein.

As illustrated in FIG. 6, the electronic device includes: one or more processors 501, a memory 502, and interfaces for connecting respective components which include a high-speed interface and a low-speed interface. Respective components are coupled to each other using different buses and may be installed on a common motherboard or installed in other ways as required. The processor may process instructions executed within the electronic device, including instructions stored in or on a memory to display graphical information of a GUI (graphical user interface) on an external input/output device (such as a display device coupled to an interface). In other embodiments, a plurality of processors and/or buses may be used with a plurality of memories if desired. Similarly, a plurality of electronic devices may be connected, each device provides a part of necessary operations (e.g., as a server array, a set of blade servers, or a multiprocessor system). FIG. 6 takes a processor 501 as an example.

The memory 502 is a non-transitory computer readable storage medium provided in the present disclosure. The memory stores instructions executable by at least one processor, such that the at least one processor is configured to execute the method for the vector representation of the text according to the present disclosure. The non-transitory computer readable storage medium of the present disclosure stores computer instructions for causing a computer to execute the method for generating a vector representation of a text according to the present disclosure.

As the non-transitory computer readable storage medium, the memory 502 may be used to store a non-transitory software program, a non-transitory computer executable program, and a module, such as program instructions/modules corresponding to the method for the vector representation of the text in embodiments of the present disclosure (e.g., the dividing module 41, the representing module 42, and the recognizing module 43 illustrated in FIG. 4). The processor 501 executes various functional applications and data processing of a server by operating the non-transitory software program, instructions, and modules stored in the memory 502, i.e., implements the method for generating a vector representation of a text described above.

The memory 502 may include a storage program area and a storage data area. The storage program area may store applications required by an operating system and at least one function. The storage data area may store data created according to the use of the electronic device for executing the method for the vector representation of the text. In addition, the memory 502 may include a high-speed random access memory, and may also include a non-transitory memory, such as at least one disk memory device, flash memory device, or other non-transitory solid-state memory devices. In some embodiments, the memory 502 may optionally include memories remotely disposed with respect to the processor 501. These memories may be connected to the electronic device for executing the method for the vector representation of the text through a network. Examples of the networks include, but are not limited to, the Internet, an intranet, a local area network, a mobile communication network, and combinations thereof.

The electronic device for executing the method for the vector representation of the text may also include an input device 503 and an output device 504. The processor 501, the memory 502, the input device 503, and the output device 504 may be coupled by the bus or other means, for example, by a bus in FIG. 5.

The input device 503 may receive an input digital or character information, and generates key signal input related to user settings and function control of the electronic device for executing the method for the vector representation of the text, such as a touch screen, a keypad, a mouse, a trackpad, a touchpad, a pointing stick, one or more mouse buttons, a trackball, a joystick, and other input device. The output device 504 may include a display device, an auxiliary lighting device (e.g., LED), a tactile feedback device (e.g., vibration motor), and the like. The display device may include, but be not limited to, a liquid crystal display (LCD), a light emitting diode (LED) display, and a plasma display. In some embodiments, the display device may be a touch screen.

Respective embodiments of the systems and technologies described herein may be implemented in a digital electronic circuit system, an integrated circuit system, an application specific ASIC (application specific integrated circuit), computer hardware, firmware, software, and/or combinations thereof. These embodiments may be implemented in one or more computer programs. The one or more computer program may be executed and/or interpreted on a programmable system including at least one programmable processor. The programmable processor may be a dedicated or general purpose programmable processor that may receive data and instructions from a storage system, at least one input device, and at least one output device, and transmit the data and instructions to the storage system, the at least one input device, and the at least one output device.

These computing programs (also referred to as programs, software, software applications, or codes) include machine instructions of a programmable processor, and may be implemented using high-level processes and/or object-oriented programming languages, and/or assembly/machine languages. As used herein, the terms "machine readable medium" and "computer readable medium" refer to any computer program product, device, and/or apparatus (e.g., a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal used to provide the machine instructions and/or data to the programmable processor.

In order to provide interaction with a user, the systems and technologies described herein may be implemented on a computer. The computer has a display device (e.g., a CRT (cathode ray tube) or LCD (liquid crystal display) monitor) for displaying information to the user, a keyboard and pointing device (e.g., a mouse or trackball). The user may provide input to the computer through the keyboard and the pointing device. Other kinds of devices may also be used to provide interaction with users. For example, a feedback provided to the user may be any form of sensory feedback (e.g., a visual feedback, an auditory feedback, or a tactile feedback), and may receive input from the user in any form (including acoustic input, voice input, or tactile input).

The systems and technologies described herein may be implemented in a computing system (e.g., as a data server) including a background component, a computing system (e.g., an application server) including a middleware component, a computing system including a front-end component (e.g., a user computer having a graphical user interface or a web browser, through which the user may interact with embodiments of the systems and technologies described herein), or a computing system including any combination of such background component, middleware component, or front-end component). Components of the system may be connected to each other by digital data communication (such as a communication network) in any form or medium. Examples of the communication network include a local area network (LAN), a wide area network (WAN), and the Internet.

The computer system may include a client and a server. The client and the server are generally remote from each other and typically interact through the communication network. A client-server relationship is generated by computer programs operating on corresponding computers and having the client-server relationship with each other.

According to the technical solution of embodiments of the present disclosure, the text is divided into multiple text segments. Each text segment is represented as the segment vector corresponding to the respective text segment by employing the first-level semantic model. The mapping relationship between a character of each text segment and the segment vector of that text segment is obtained from the first-level semantic model. The segment vector is configured to indicate the semantics of the text segment. The text semantics recognition is performed on the segment vector of each text segment by employing the second-level semantic model to obtain the text vector for indicating the topic of the text. The mapping relationship between segment vectors and the text vector is obtained from the second-level semantic model. With the semantic models of two levels, paragraph-level information and text-level information may be obtained, and the text vector for indicating the topic of the text may be generated as well. Therefore, full information of the text is obtained and the loss of information is reduced.

It should be understood that steps may be reordered, added or deleted using various forms of processes illustrated above. For example, each step described in the present disclosure may be executed in parallel, sequentially or in different orders, so long as a desired result of the technical solution disclosed in the present disclosure may be achieved, which is not limited here.

The above detailed embodiments do not limit the protection scope of the present disclosure. Those skilled in the art may understand that various modifications, combinations, sub-combinations and substitutions may be made according to design requirements and other factors. Any modification, equivalent substitution and improvement made within the spirit and principles of the present disclosure shall be included in the protection scope of the present disclosure.

What is claimed is:

1. A method for generating a vector representation of a text, comprising:
   dividing the text into a plurality of text segments;
   representing each text segment as a segment vector corresponding to a respective text segment by employing a first-level semantic model, wherein a mapping relationship between a character of each text segment and the segment vector of the text segment is obtained from the first-level semantic model, and the segment vector is configured to indicate semantics of the text segment; and
   performing text semantics recognition on the segment vector of each text segment by employing a second-level semantic model to obtain a text vector for indicating a topic of the text, wherein a mapping relationship between segment vectors and the text vector is obtained from the second-level semantic model;
   wherein performing the text semantics recognition on the segment vector of each text segment by employing the second-level semantic model to obtain the text vector for indicating the topic of the text comprises:
   adding an element of position to the segment vector of each text segment to obtain an input vector of each text segment, the element of position being configured to indicate a position of the text segment in the text;
   inputting the input vector of each text segment to the second-level semantic model together with a reference vector equaling to an initial value, such that the second-level semantic model adjusts a value of the reference vector based on the input vector of each text segment, to obtain an adjusted reference vector; and
   taking the adjusted reference vector as the text vector.

2. The method of claim 1, wherein representing each text segment as the segment vector corresponding to the respective text segment by employing the first-level semantic model comprises:
   for each text segment, adding an end character at an end of the text segment, and inputting the text segment comprising the end character to the first-level semantic model to obtain a vector representation of each character in the text segment; and
   taking a vector representation of the end character of the text segment as the segment vector of the text segment.

3. The method of claim 2, further comprising:
   training the first-level semantic model and the second-level semantic model by employing a first training task;
   wherein the first training task comprises:
   for each text segment, obtaining a vector representation of a character comprised in the text segment;
   obtaining a predicted vector representation of the character based on the vector representation of the character and the text vector; and
   adjusting parameters of the first-level semantic model and the second-level semantic model based on a difference between the predicted vector representation of the character and the vector representation of the character.

4. The method of claim 1, further comprising:
   training the first-level semantic model and the second-level semantic model by employing a second training task;
   wherein the second training task comprises:
   obtaining a text vector of a training text, the training text being obtained by splicing a training body text and a training title;
   predicting whether semantics of the training text of training samples matches match with semantics of the training title based on the text vector, to obtain a predicted matching result; and
   adjusting parameters of the first-level semantic model and the second-level semantic model based on a difference between the predicted matching result and an actual matching result.

5. The method of claim 4, wherein there are a plurality of training texts including positive training texts and negative training texts; each positive training text is obtained by splicing the training body text and the training title corresponding to the training body text; and each negative training text is obtained by splicing the training body text and the training title corresponding to another training body text.

6. The method of claim 1, wherein there are a plurality of first-level semantic models, each first-level semantic model is configured to represent a corresponding text segment as the segment vector; and the plurality of first-level semantic models share common parameters.

7. A computing device, comprising:
   a memory;
   a processor; and
   a computer program, stored in the memory and executable by the processor,
   wherein when the computer program is executed by the processor, the processor is configured to:
   divide a text into a plurality of text segments;
   represent each text segment as a segment vector corresponding to a respective text segment by employing a first-level semantic model, wherein a mapping relationship between a character of each text segment and the segment vector of the text segment is obtained from the first-level semantic model, and the segment vector is configured to indicate semantics of the text segment; and
   perform text semantics recognition on the segment vector of each text segment by employing a second-level semantic model to obtain a text vector for indicating a topic of the text, wherein a mapping relationship between segment vectors and the text vector is obtained from the second-level semantic model;
   wherein the processor is further configured to:
   add an element of position to the segment vector of each text segment to obtain an input vector of each text segment, the element of position being configured to indicate a position of the text segment in the text;

input the input vector of each text segment to the second-level semantic model together with a reference vector equaling to an initial value, such that the second-level semantic model adjusts a value of the reference vector based on the input vector of each text segment, to obtain an adjusted reference vector; and take the adjusted reference vector as the text vector.

8. The computing device of claim 7, wherein the processor is further configured to:

for each text segment, add an end character at an end of the text segment, and input the text segment comprising the end character to the first-level semantic model to obtain a vector representation of each character in the text segment; and take a vector representation of the end character of the text segment as the segment vector of the text segment.

9. The computing device of claim 8, wherein the processor is further configured to:

train the first-level semantic model and the second-level semantic model by employing a first training task;

wherein the first training task comprises:

for each text segment, obtaining a vector representation of a character comprised in the text segment;

obtaining a predicted vector representation of the character based on the vector representation of the character and the text vector; and adjusting parameters of the first-level semantic model and the second-level semantic model based on a difference between the predicted vector representation of the character and the vector representation of the character.

10. The computing device of claim 7, wherein the processor is further configured to:

train the first-level semantic model and the second-level semantic model by employing a second training task;

wherein the second training task comprises:

obtaining a text vector of a training text, the training text being obtained by splicing a training body text and a training title;

predicting whether semantics of the training text of training samples match with semantics of the training title based on the text vector, to obtain a predicted matching result; and adjusting parameters of the first-level semantic model and the second-level semantic model based on a difference between the predicted matching result and an actual matching result.

11. The computing device of 12, wherein there are a plurality of training texts including positive training texts and negative training texts; each positive training text is obtained by splicing the training body text and the training title corresponding to the training body text; and each negative training text is obtained by splicing the training body text and the training title corresponding to another training body text.

12. The computing device of claim 7, wherein there are a plurality of first-level semantic models, each first-level semantic model is configured to represent a corresponding text segment as the segment vector; and the plurality of first-level semantic models share common parameters.

13. A non-transitory computer readable storage medium, having a computer program stored thereon, wherein a method for generating a vector representation of a text is executed when the computer program is executed by a processor, the method comprising:

dividing the text into a plurality of text segments;

representing each text segment as a segment vector corresponding to a respective text segment by employing a first-level semantic model, wherein a mapping relationship between a character of each text segment and the segment vector of the text segment is obtained from the first-level semantic model, and the segment vector is configured to indicate semantics of the text segment; and performing text semantics recognition on the segment vector of each text segment by employing a second-level semantic model to obtain a text vector for indicating a topic of the text, wherein a mapping relationship between segment vectors and the text vector is obtained from the second-level semantic model;

wherein performing the text semantics recognition on the segment vector of each text segment by employing the second-level semantic model to obtain the text vector for indicating the topic of the text comprises:

adding an element of position to the segment vector of each text segment to obtain an input vector of each text segment, the element of position being configured to indicate a position of the text segment in the text;

inputting the input vector of each text segment to the second-level semantic model together with a reference vector equaling to an initial value, such that the second-level semantic model adjusts a value of the reference vector based on the input vector of each text segment, to obtain an adjusted reference vector; and taking the adjusted reference vector as the text vector.

14. The non-transitory computer readable storage medium of claim 13, wherein representing each text segment as the segment vector corresponding to the respective text segment by employing the first-level semantic model comprises:

for each text segment, adding an end character at an end of the text segment, and inputting the text segment comprising the end character to the first-level semantic model to obtain a vector representation of each character in the text segment; and taking a vector representation of the end character of the text segment as the segment vector of the text segment.

15. The non-transitory computer readable storage medium of claim 14, wherein the method further comprises:

training the first-level semantic model and the second-level semantic model by employing a first training task;

wherein the first training task comprises:

for each text segment, obtaining a vector representation of a character comprised in the text segment;

obtaining a predicted vector representation of the character based on the vector representation of the character and the text vector; and adjusting parameters of the first-level semantic model and the second-level semantic model based on a difference between the predicted vector representation of the character and the vector representation of the character.

16. The non-transitory computer readable storage medium of claim 13, wherein the method further comprises:

training the first-level semantic model and the second-level semantic model by employing a second training task;

wherein the second training task comprises:

obtaining a text vector of a training text, the training text being obtained by splicing a training body text and a training title;

predicting whether semantics of the training text of training samples match with semantics of the training title based on the text vector, to obtain a predicted matching result; and adjusting parameters of the first-level semantic model and the second-level semantic model based on a difference between the predicted matching result and an actual matching result.

17. The non-transitory computer readable storage medium of claim 16, wherein there are a plurality of training texts including positive training texts and negative training texts; each positive training text is obtained by splicing the training body text and the training title corresponding to the training body text; and each negative training text is obtained by splicing the training body text and the training title corresponding to another training body text.

* * * * *